US007110869B2

United States Patent
Tao et al.

(10) Patent No.: US 7,110,869 B2
(45) Date of Patent: Sep. 19, 2006

(54) HYBRID TRANSMISSION MEMBER SPEED DETERMINATION, SENSOR DIAGNOSTICS AND FAULT RECOVERY

(75) Inventors: Xuefeng T. Tao, Greenwood, IN (US); Tung-Ming Hsieh, Carmel, IN (US); Jy-Jen F. Sah, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 213 days.

(21) Appl. No.: 10/686,004

(22) Filed: Oct. 14, 2003

(65) Prior Publication Data

US 2005/0080527 A1   Apr. 14, 2005

(51) Int. Cl.
*G01M 17/00*  (2006.01)
(52) U.S. Cl. .............................. 701/34; 701/22; 701/51; 701/53; 701/54; 477/7; 180/65.6
(58) Field of Classification Search ................. 701/51, 701/53–54, 61–64, 22, 34; 477/3, 6–7, 15, 477/115; 475/5, 14, 84; 180/65.1, 65.6, 180/65.7
See application file for complete search history.

(56) References Cited

U.S. PATENT DOCUMENTS

| | | | |
|---|---|---|---|
| 4,947,325 A | 8/1990 | Iwata et al. ................... 701/34 |
| 5,060,176 A * | 10/1991 | Nawa et al. ................... 701/51 |
| 5,085,071 A * | 2/1992 | Mizushina et al. ......... 73/118.1 |
| 5,403,244 A * | 4/1995 | Tankersley et al. ........... 477/20 |
| 5,445,234 A * | 8/1995 | Hall, III ..................... 180/6.28 |
| 5,833,570 A * | 11/1998 | Tabata et al. .................. 477/3 |
| 5,841,201 A * | 11/1998 | Tabata et al. ............. 290/40 C |
| 5,931,757 A | 8/1999 | Schmidt ......................... 475/2 |
| 5,983,152 A * | 11/1999 | Genzel et al. ................. 701/51 |
| 6,090,007 A * | 7/2000 | Nakajima et al. ............. 477/46 |
| 6,186,255 B1 * | 2/2001 | Shimasaki et al. ......... 180/65.3 |
| 6,343,250 B1 * | 1/2002 | Kuras et al. ................... 701/51 |
| 6,347,289 B1 | 2/2002 | VanderLeest ............... 702/115 |
| 2003/0078134 A1 * | 4/2003 | Kojima et al. .................. 477/3 |

* cited by examiner

*Primary Examiner*—Gertrude A. Jeanglaude
(74) *Attorney, Agent, or Firm*—Christopher DeVries (57) ABSTRACT

A hybrid powertrain has a transmission including a motor and a sensor for sensing rotation of the transmission output member. Motor speed signals are available from the motor controller. Speed signals representative of output speed are calculated from both the speed sensor and the motor speed in conjunction with known speed relationships between the motor and the output. A variety of in-range and dropped signal diagnostics is performed for the sensors and are used in the development of a set of software switches for selecting which of the speed sources is used as the output speed.

10 Claims, 8 Drawing Sheets

HYBRID TRANSMISSION MEMBER SPEED DETERMINATION, SENSOR DIAGNOSTICS AND FAULT RECOVERY

TECHNICAL FIELD

The present invention is related to control of a vehicular powertrain. More particularly, the invention is concerned with speed sensing in a hybrid transmission.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

As with any vehicular transmission, it is desirable in a hybrid transmission to measure rotational speed of the output shaft or a member that is ratiometrically synchronized therewith in its rotation in order to determine vehicle speed and provide needed information regarding the transmission operation for use in its control. Various technologies are known for providing such speed information including variable reluctance (VR) sensors, magneto resistive (MR) sensors, and hall effect (HE) sensors. In all such sensors a target wheel comprising alternating regions of high and low permeability (e.g. toothed wheel) rotates in proximity to a sensing element to generate a pulse train in accordance with the target wheel rotation. For strict speed sensing where position is not a desired metric to be measured, the target wheel is generally uniform in the distribution of the high and low permeability regions. Other distribution patterns are generally reserved for encoded applications which can discern position or angular rotational information therefrom.

With respect to a transmission output, and perhaps other transmission members, accurate speed detection is desired and, while angular position is not, direction of rotation is a desired metric for measurement. As such, it is common practice to employ a pair of such sensors separated by a predetermined electrical angle which allows for determining the speed and direction of rotation—the speed being essentially a frequency based signal and the direction being a relative event based signal.

Full range speed sensing may be critical in certain applications such as output speed sensing in a transmission. With respect to hybrid transmissions, this is true since accurate speed control—itself a critical factor in hybrid transmission operation—requires precise measurements down to and through zero vehicle speed. In this regard, MR and HE sensors are truly zero-velocity sensors since the output signal amplitude is substantially consistent and detectible regardless of the target wheel speed whereas (VR) sensors have an output whose amplitude decreases with decreasing speed and eventually is undetectable at lower speeds. Additionally, HE and MR sensors are generally well adapted to diagnosis through direct measurement means without interfering with the speed measurements whereas VR sensors do not lend themselves as readily to easy monitoring and automated fault detection. However, HE sensors generally rely upon an actively magnetic target wheel and are not commonly employed in automotive speed sensing applications. MR sensors generally require some controlled current or voltage source and are sensitive to temperature and air gap fluctuations. VR sensors generally do not suffer from the same shortcomings of HE and MR sensors. Additionally, VR sensors are generally more robust in an automotive environment of vibration and high temperatures.

SUMMARY OF THE INVENTION

The present invention provides for novel speed sensor diagnostics and utilization of multiple sources for determining transmission member speed, resulting in a robust, fault tolerant system. The invention takes advantage of motor speed signals in the transmission and reflected gear ratios or effective gear ratios in determining a measure of output speed for the transmission in addition to at least one speed signal determined from a speed sensor sensing rotation of the output shaft. Where confidence in the sensor signals is compromised as determined by a number of diagnostic tests and logic, the motor based output speed may be substituted therefore in the system controls. Loss of confidence in the sensor signals may be the result of dropped signals, operational faults or with some sensing technologies attenuation of sensor output to unusable levels.

DESCRIPTION OF THE PREFERRED EMBODIMENT

Figure 1:
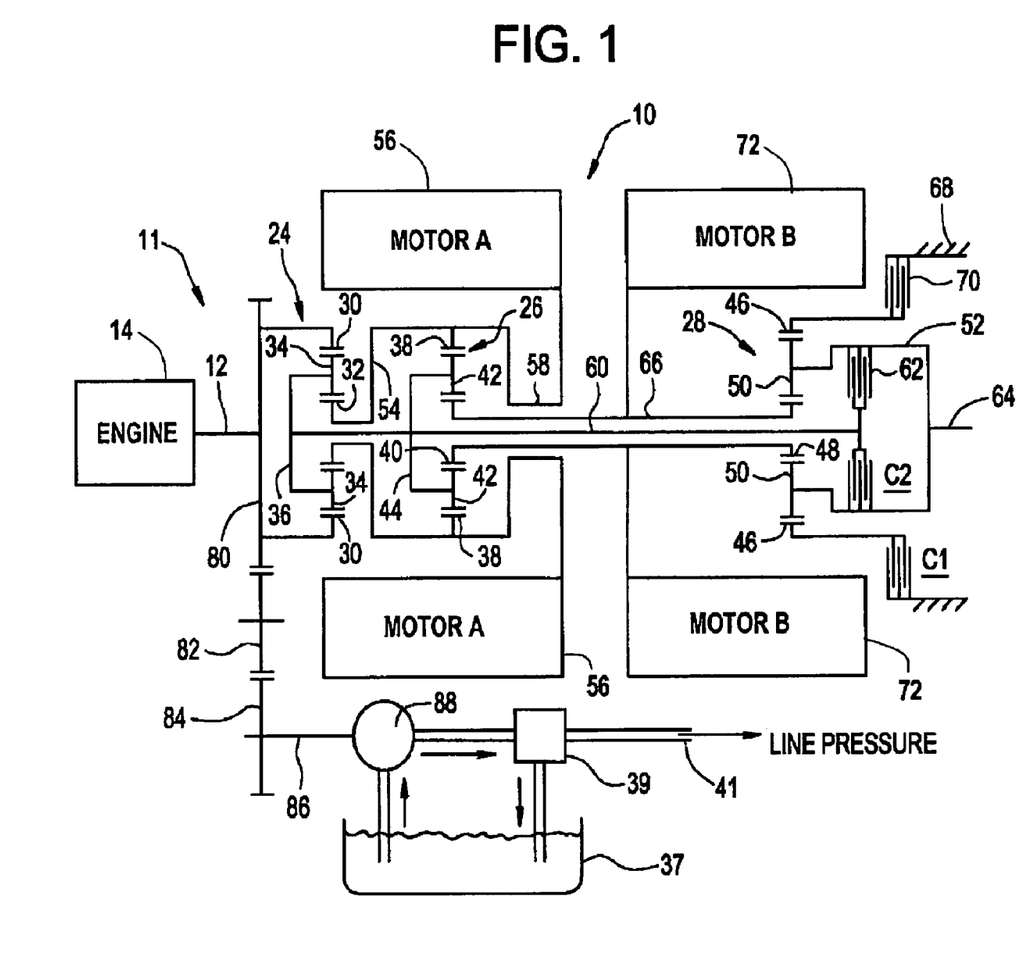
FIG. 1 is a mechanical hardware schematic representation of one preferred form of a two-mode, compound-split, electrically variable transmission particularly benefiting from the present invention.
Figure 2:
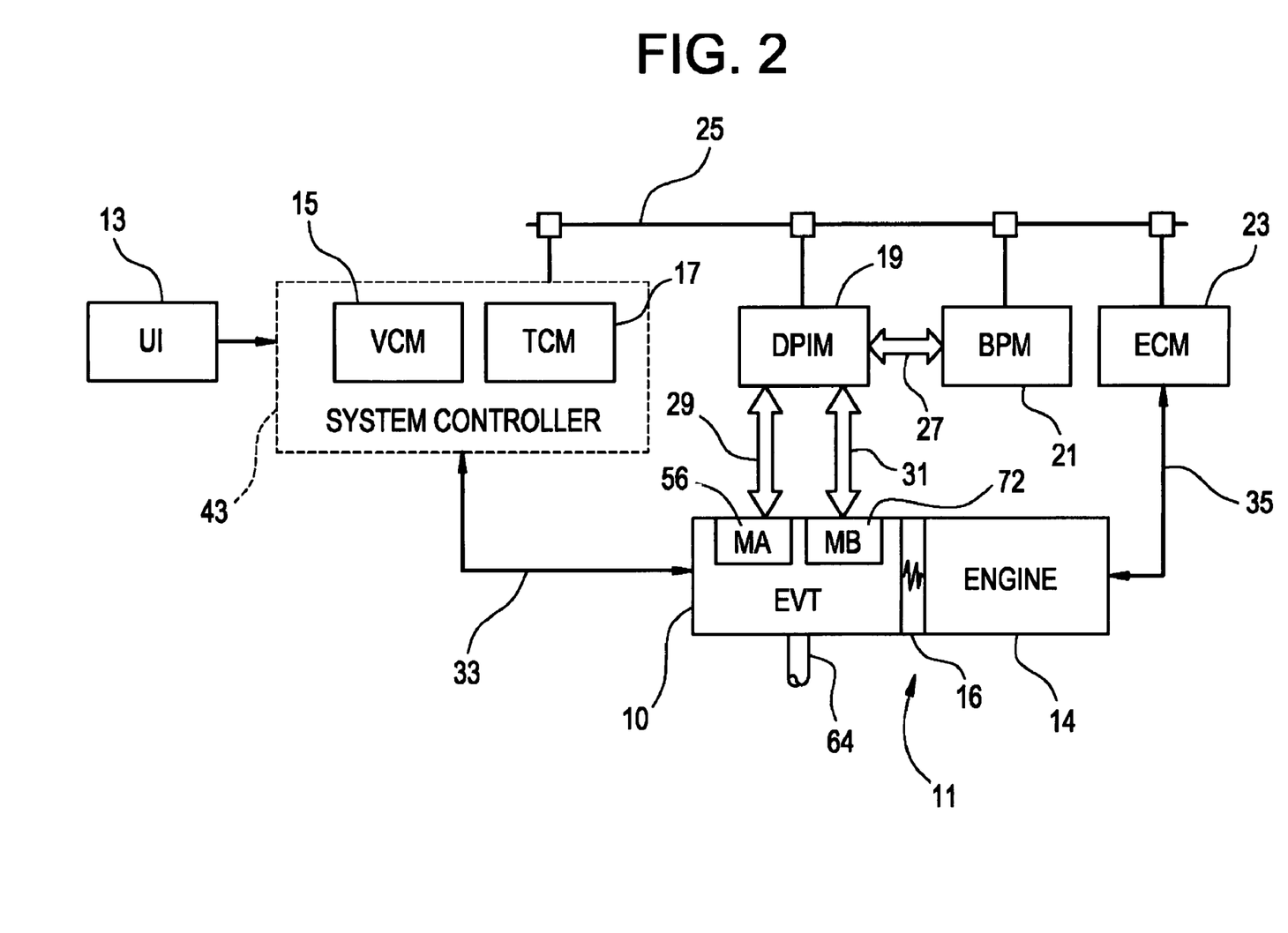
FIG. 2 is an electrical and mechanical schematic of a preferred system architecture for the hybrid powertrain disclosed herein.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or MA.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or MB. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28. As used herein, when a mode related to a gear train is referenced an upper case designation MODE 1 or MODE 2, or M1 or M2, will generally be used.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engines electronics, controls and quantities are generally well known to those skilled in the art and further detailed exposition thereof is not required herein As should be apparent from the foregoing description the EVT 10 selectively receives power from the engine 14. As will now be explained with continued reference to FIG. 2 the EVT also receives power from an electric storage device such as one or more batteries in battery pack module (BPM) 21. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 3 land provides current to the DC lines 27. The net DC current provided to or from the inverters determines the charge or discharge operating mode of the BPM 21. Preferably, $M_A$ and $M_B$ are three-phase AC machines and the inverters comprise complementary three-phase power electronics. Individual motor speed signals Na and Nb for $M_A$ and $M_B$, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Trim valves are preferably employed using variable bleed solenoids to provide precise placement of the spool within the valve body and correspondingly precise control of clutch pressure during apply. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others.

System controller 43 determines a torque command Te_cmd and provides it to ECM 23. Torque command Te_cmd is representative of the EVT torque contribution desired from the engine as determined by the system controller. System controller 43 also determines a speed command Ne_des representative of the EVT input speed desired, which in the direct coupled arrangement between the engine and the EVT is also the desired engine speed operating point. With the direct coupled arrangement exemplified herein, the engine torque and the EVT input torque, Te and Ti respectively, are equivalent and may be referred to in the alternative herein. Similarly, the engine speed and the EVT input speed, Ne and Ni respectively, are equivalent and may be referred to in the alternative herein.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
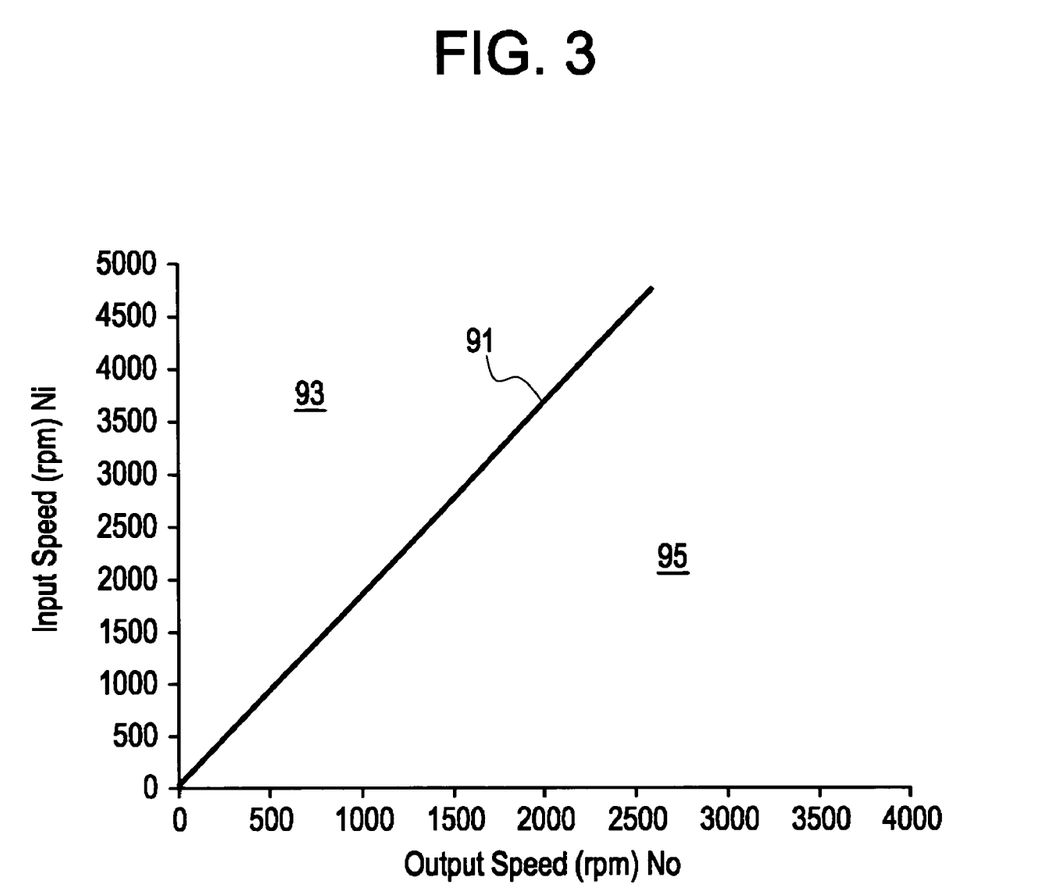
FIG. 3 is a graphical representation of various regions of operation with respect to input and output speeds of the exemplary electrically variable transmission disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited.

While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 93. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

Figure 4:
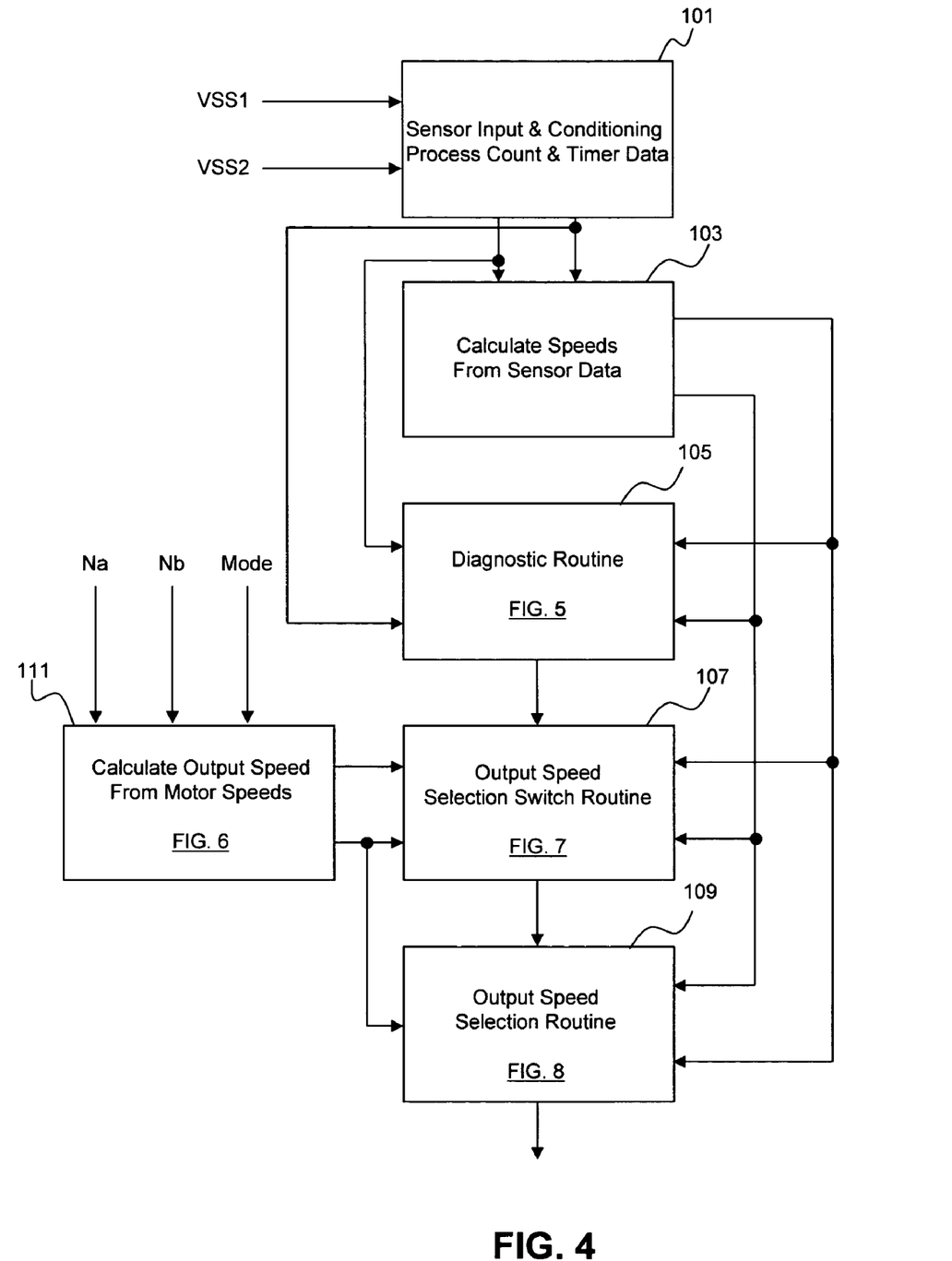
FIG. 4 is a block diagram illustrating hardware and software implemented functions of the present invention.

With reference now to FIG. 4, a block diagram illustrates a hardware and software implementation structure for the present invention. A pair of conventional speed sensors (not shown) adapted to sense rotation of the output member of the EVT provide individual output signals in the form of periodic analog signals labeled individually as VSS1 and VSS2. The signals are provided to inputs og the system controller 43. At block 101, the signals are received by input and conditioning circuitry for providing such functionality as buffering, amplification, and squaring-up to provide a periodic, binary pulse train having a frequency proportional to the rotation of the output member. Block 101 also preferably performs hardware based preprocessing of the pulse train to obtain cumulative and cycle differential pulse count and timer data for temporary storage and referral in the calculation of speed and direction signals and diagnostics. The count and timer data are provided from block 101 to blocs 103 and at least the count data are provided to block 105 for use in the calculation of individual speed signals corresponding to each of the speed sensors and diagnostics, respectively.

At block 103, periodic requests are made for the pulse count and time data stored in the hardware preprocessing block 101. Raw speeds for each sensor are then calculated in a conventional fashion with the edge count and time data and calibrations such as number of target wheel teeth, timer frequency, and software loop or interrupt interval. Techniques for calculating such raw speed data or signals from rotation sensors are generally well known to those skilled in the art.

The raw speed data is provided to block 105, 107 and 109. As previously mentioned, block 105 also receives from block 101 at least the count data corresponding to each sensor. A variety of tests are performed at block 105 upon the various speed and count data to diagnose undesirable operating conditions with respect to the sensors. Diagnostic flags are provided by block 105 to block 107. Further detail of such exemplary diagnostics is found below in conjunction with a description of FIG. 5.

At block 111, motor speeds Na and Nb corresponding, respectively, to $M_A$ and $M_B$ are stored as global software variables accessible by the present routine. As previously mentioned, motor speed are derived in a conventional fashion by DPIM 19 using motor phase information. Alternatively, data motor encoders or discrete speed sensors may provide motor speed signals for utilization at block 111. In addition to the motor speed Na and Nb, transmission mode information is provided to block 111. One manner of providing mode information is by way of hardware or software clutch pressure switches which monitor application chamber pressures to determine the application state thereof. The application states of the clutches in the present exemplary EVT determine and indicate the gearset mode. Block 111 then functions to calculate a speed for the transmission output (motor derived output speed) and provides it to blocks 107 and 109. Additionally, a flag indicative of the availability of a motor derived output speed signal is provided to block 107. Further detail of the processes of block 111 is found below in conjunction with a description of FIG. 6.

At block 107, the diagnostic flags from block 105 are received, the availability flag and the motor derived output speed from block 111 are received and the raw speed data are received from block 103. The process represented by block 107 determines, from diagnostic flags and calculated speed and count quantities a plurality of software switches used in the selection of one of the motor derived output speed and sensor derived output speed for use as the transmission output speed. Block 107 provides a set of logical selection switches to block 109. Further detail of the processes of block 111 is found below in conjunction with a description of FIG. 7.

Finally, the process represented by block 109 has as inputs thereto motor derived output speed, the software switches from block 107 and the raw speed data from block 103. A set of tests on the switches is performed in a sequentially significant manner to thereby arrive at a determination of which of the two speed calculations—motor derived or sensor derived—will be utilized as the transmission output speed.

With reference now to the flow diagrams of FIGS. 5 through 8, various sets of program steps for execution by the system controller 43 are illustrated. The steps represented in the figures are part of a much larger set of program instructions being executed by the system controller in carrying out various monitoring, control and diagnostic functions for powertrain and the vehicle into which it is incorporated. The routines may be executed at a regular interval such as by conventional timer interrupts or in an event based implementation such as by an event interrupt.

Figure 5:
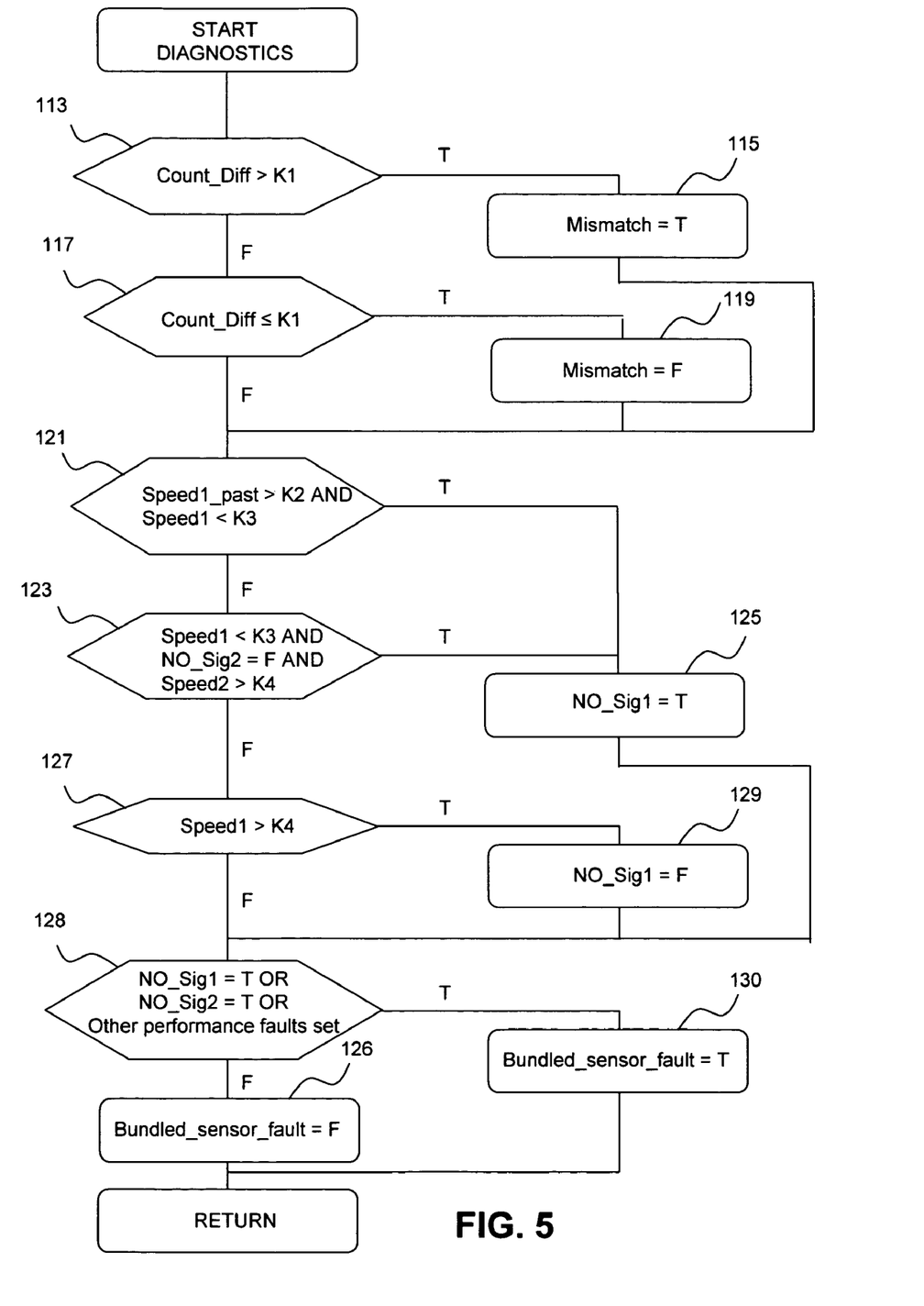
FIG. 5 is a flow diagram representing steps in a diagnostic routine in accordance with the present invention.

The routine of FIG. 5 is entered and processes count data from both speed sensors to determine the sensor-to-sensor difference between counts "Count_diff." Count_diff in excess of a first calibrated threshold (K1) for a predetermined number of passes through the routine will set a mismatch flag "Mismatch" to a logical true value (blocks 113, 115) and thereafter pass control to block 121. Count_diff not in excess of the calibrated threshold for a predetermined number of passes through the routine will set Mismatch to a logical false value (blocks 117, 119) and thereafter pass control to block 121. Mismatches between sensors may indicate an in-range failure whereby the counts from each in its own right are present and within an acceptable range as can be expected from the system but which nonetheless is indicative of corrupt data from one of the sensors exhibiting too many or too few pulses for the rotation of the output shaft.

At block 121, current and historical raw speed data Speed1 corresponding to a first speed sensor is used to determine if the signal from that sensor was lot, such as by an open harness, connector fault or other definitive fault. Designations of first and second speed sensors herein is merely for distinguishing identification of one sensor from another and the does not imply any precedence, order, hierarchy or the like. A comparison of recent prior speed data "Speed1_past" through a predetermined number of passes through the routine to a second calibrated threshold and a comparison of current speed data "Speed1" through a predetermined number of passes through the routine to a third calibrated threshold K3 are performed. Where both conditions are true, an indication that a relatively rapid and sustained loss of signal has occurred. Thus, such a result will set a signal lost flag for the first speed sensor "NO_Sig1" to a logical true value (block 125) indicating a fault and thereafter allow for the routine exit. Where one or both conditions looked at in block 121 are false, control passes to block 123 for a further diagnosis. Here, Speed1 is again compared to K3. Additionally, the current raw speed data Speed2 corresponding to the other of the speed sensors is compared to a fourth calibrated threshold K4. Additionally, the logical status of the signal lost flag for the second speed sensor "NO_Sig2" is checked. Where, through a predetermined number of passes through the routine, Speed1 is less than K3 and Speed2 is greater than K4 and NO_Sig2 fault is set, NO_Sig1 will be set to a logical true value (block 125) indicating a fault and thereafter allow for the routine exit. Where one or more of the checks of block 123 fail, block 127 is executed. Therein, Speed1 is checked against calibrated threshold K4 and if in excess thereof through a predetermined number of passes through the routine results in the clearing of the NO_Sig1 flag by setting it to a logical false value. Next, block 128 checks both NO_Sig1 and NO_Sig2 flags and other diagnostic faults associated with the sensors, for example conventional performance type diagnostics (e.g. excessive rates of change in the sensor signals). If any sensor related diagnostic fault is set, then a "Bundled_sensor_fault" flag is set to a true value at block 130. If no sensor related diagnostic fault is set, then Bundled_sensor_fault flag is set to a false value at block 126. Thereafter, the routine is exited. It is therefore understood that the routine of FIG. 5 performs diagnostics upon the sensors to determine whether there exists an in-range fault or a dropped or lost sensor signal for the first speed sensor. A similar routine for diagnosing the second speed sensor is not separately illustrated but is understood by those skilled in the art to be executed in conjunction with the routine just described. Additionally, the diagnostic routine described is most applicable to variable reluctance sensors which are not diagnosable by more direct measurement means but rather depend upon inferential diagnostics. Other routines for other sensor types can be adapted for use therewith to similarly diagnose in-range and dropped signal faults.

Figure 6:
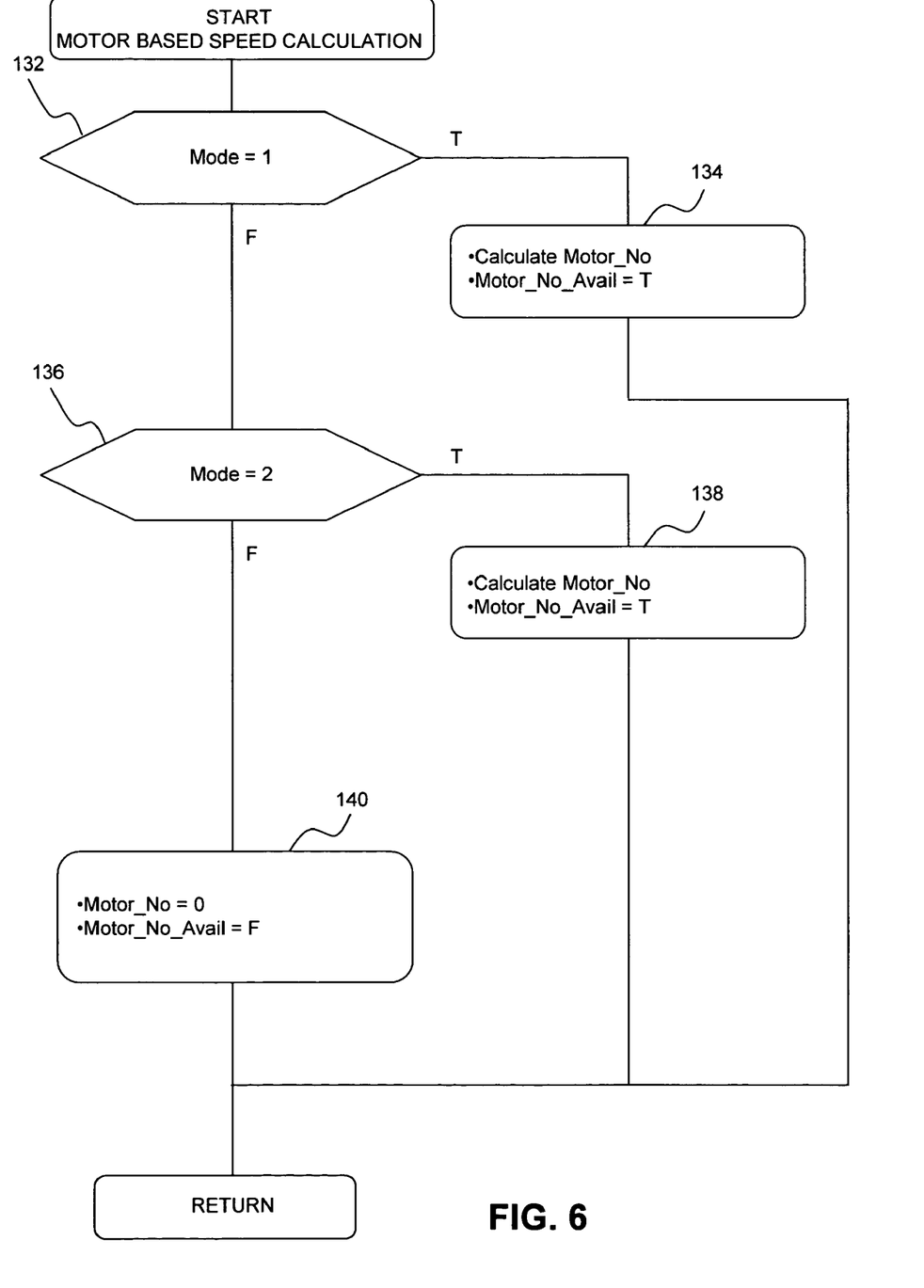
FIG. 6 is a flow diagram representing steps in a motor speed based calculation of transmission output speed in accordance with the present invention.

The diagnostics having thus been performed and diagnostic flags having been set as described, the routine of FIG. 6 is next described wherein the objective is to calculate a motor speed based output speed signal. A determination is made as to which mode is currently active (blocks 132, 136), such as by the clutch C1 and C2 states as inferred by clutch chamber pressure switches. Where neither mode is active (e.g. neutral or fixed-ratio operation), the motor based output speed "Motor_No" is set to zero and a motor based output speed available flag "Motor_No_Avail" is set to a logical false value thus indicating that there is no motor based output speed data available. Thereafter, the routine would be exited. If, however, either mode 1 or mode 2 is active, Motor_No is calculated at a respective one of blocks 134 and 138 as a function of motor speeds Na and Nb and various effective gear ratios within the transmission and Ni. The specific relationships and calculations for the present exemplary hybrid transmission as follows.

For gearsets 24 and 26, respectively:

$$Ni(R1)+Na(S1)=Nc(CC1) \quad (1)$$

$$Na(R2)+Nb(S2)=Nc(CC2) \quad (2)$$

where

Ni is input member speed,
Na is motor A speed,
Nc is carrier speed,
Nb is motor B speed,
R1 is outer gear member 30 tooth count,
S1 is inner gear member 32 tooth count,
R2 is outer gear member 38 tooth count,
S2 is inner gear member 40 tooth count,
CC1 is the gearset 24 carrier tooth count (R1+S1), and
CC2 is the gearset 26 carrier tooth count (R2+S2)

Equations (1) and (2) are solved to yield $$Ni=Na((R2-S1)/R1)+Nb(S2/R1) \quad (3)$$

Equations(1,2,3) are valid for both mode 1 and mode 2.

In mode 1 or reverse range for gearset 28:

$$Ng(R3)+Nb(S3)=No(CC3) \quad (4)$$

where

Ng is outer gear member 46 speed,
Nb is motor B speed,
R3 is outer gear member 46 tooth count,
S3 is inner gear member 48 tooth count,
CC3 is the gearset 28 carrier tooth count (R3+S3), and
No is the output shaft speed.

In mode 1 or reverse, clutch C1 is engaged and Ng=0. Therefore, equation (4) reduces to $$No=Nb(S3/CC3) \quad (5)$$

If motor B speed Nb is usable (e.g. no diagnostic prohibition upon its use), then equation (5) is used to calculate No. If, however, motor B speed is not usable, but input speed Ni and motor A speed Na are usable, the equations (4) and (5) are simultaneously solved for No.

In mode 2, clutch C2 is engaged and $$No=Nc \quad (6)$$

If input speed Ni and motor A speed Na are usable, then equations (1) and (6) are used to calculate Nc and No. If input speed Ni and motor B speed Nb are usable, then equations (2) and (6) are used to calculate Nc and No. Finally, motor based output speed Motor_No is equated to the calculated No.

Also, at each block 134 and 138, Motor_No_Avail is set to a logical true value thus indicating that motor based output speed data is available. Afterwards, the routine is exited.

It is important to note herein that the complexity of a multi-mode powertrain yields more complex relationships when considering the calculation of output speed from the plurality of planetary gearsets, motors, modes, and compounding of the gearsets. The principles of the present calculations, however, are equally applicable to more simplistic combinations of planetary gearsets and motors including single motor, single planetary arrangements.

Figure 7:
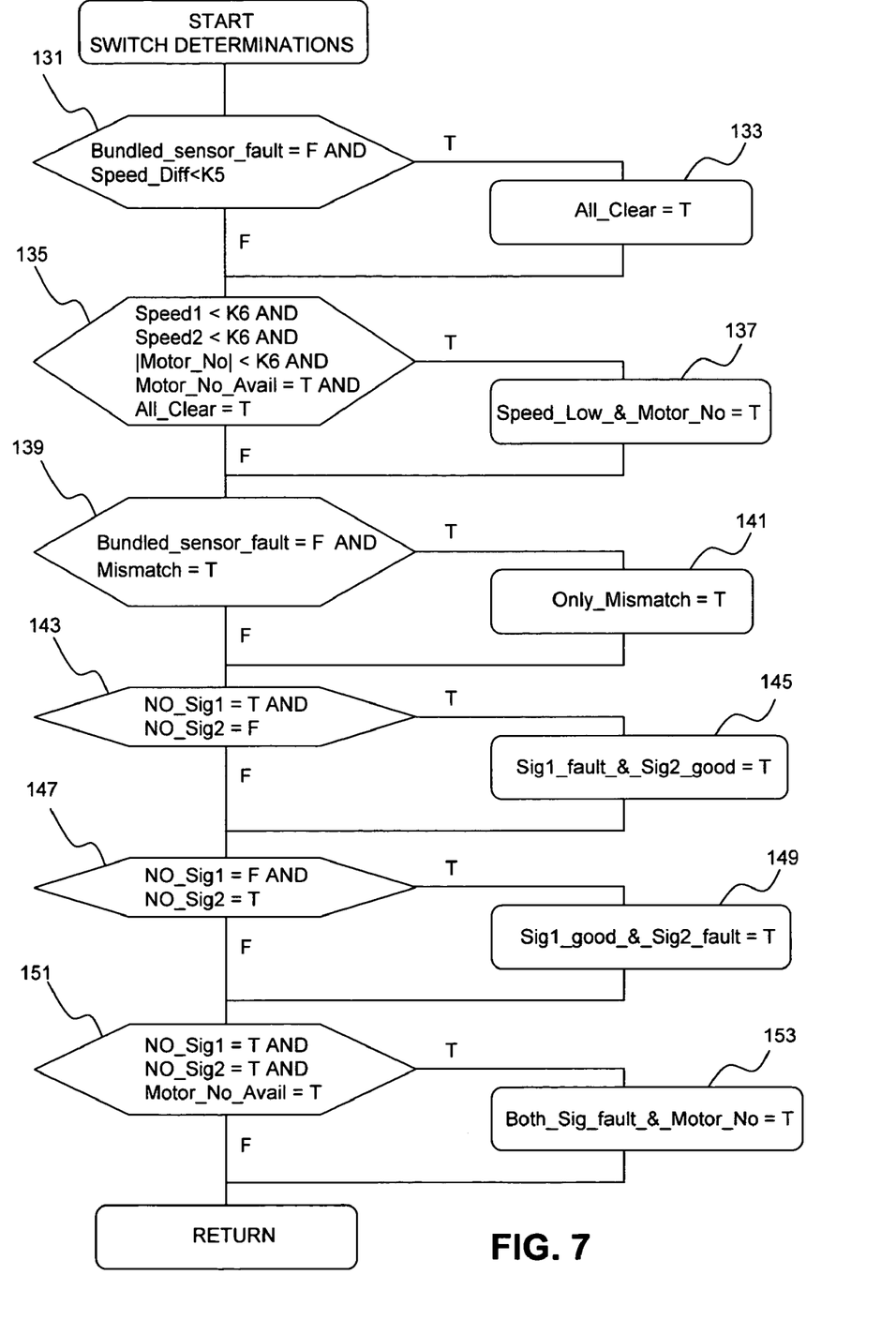
FIG. 7 is a flow diagram representing steps used in determining a set of software switches used in selecting between a sensor based output speed and a motor speed based output speed in accordance with the present invention; and, FIG. 8 is a flow diagram representing sequentially significant steps used in selecting between a sensor based output speed and a motor speed based output speed in accordance with the present invention.

The routine of FIG. 7 begins at block 131 which examines Bundled_sensor_fault flag and compares Speed1 to Speed2. Where the Bundled_sensor_fault flag indicates no sensor faults and the speed differential between the sensors "Speed_diff" is less than a fifth calibrated threshold K5, block 133 sets an "All_Clear" switch to a logical true value thus indicative of no presently active speed sensor faults. The routine continues at a next switch determination at block 135 subsequent to either block 133 or one or more of the signal lost flags being set or excessive speed differential at block 131. Block 135 provides a low speed threshold check of sensor speeds, Speed1 and Speed2, against a sixth calibrated threshold, K6. The same threshold is compared to the absolute value of the motor based output speed, Motor_No. A check against the Motor_No_Avail flag is performed as well as a check of the All_Clear flag. Where all speed signals are below the low speed threshold and motor based output speed is available without any presently active speed sensor faults, block 137 sets a "Speed Low_&_Motor_No" switch to a logical true value. The routine continues at a next switch determination at block 139 subsequent to either block 137 or one or more of the speed signals being deemed too high, motor based speed not available or some type of speed sensor fault at block 135. It is noted here that it may be advantageous to use the typically higher rotation speeds and correspondingly high resolution of motor speeds afforded by the motors in the output speed determination when low vehicle speed (i.e. low output speeds) are active. This is even more desirable when the speed sensing technology is variable reluctance which has significant signal attenuation at low speeds. Thus, such a switch enabling this capability is important. Next, block 139 examines the Bundled_fault_flag and the Mismatch flag. Where there are no sensor faults, but there exists a mismatch in sensor outputs as determined by the Mismatch flag being set, an "Only_Mismatch" switch is set to a logical true value. The routine continues at a next switch determination at block 143 subsequent to either block 141 or one or more of the signal lost flags being set or a disagreement between the Mismatch flag and the count differential check when one of them indicates a fault at block 139. Blocks 143 and 147, together with respective switch setting blocks 145 and 149 perform similar checks upon the NO_Sig1 and NO_Sig2 flags. Block pair 143, 145 sets "Sig1_fault_&_Sig2_good" switch to a logical true value when the flag states indicate only a dropped signal for the first sensor. Similarly, block pair 147, 149 sets "Sig1_good_&_Sig2_fault" switch to a logical true value when the flag states indicate only a dropped signal for the second sensor. Both Block pairs ultimately pass control to a next switch determination at block 151 whereat both NO_Sig1 and NO_Sig2 flags are examined for true values and the Motor_No_Avail flag is also checked for a true value. Where both speed sensors are dropped and a motor based output speed Motor_No is available, block 153 sets "Both_Sig_fault_&_Motor_No" switch to a logical true value. Subsequent to block 153 or either of the speed sensors being fault free or no motor based output speed being available as determined at block 151, the routine of FIG. 7 is exited.

Figure 8:
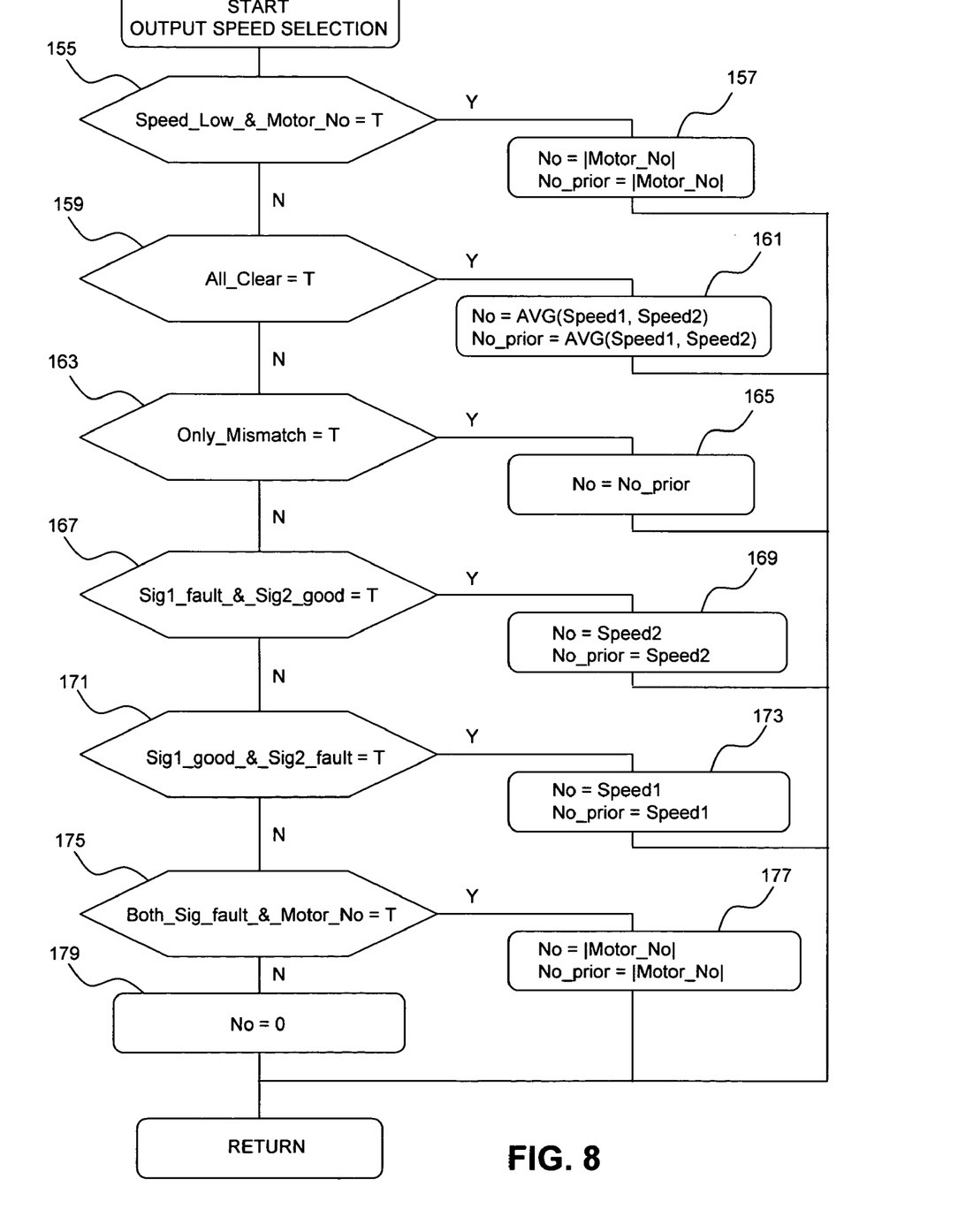

With the switches having thus been determined and the motor based output speed, Motor_No, and sensor speeds, Speed1 and Speed2, having been determined and provided, the routine of FIG. 8 is executed to select the output speed from one of the two categorically different speeds, i.e. motor based or sensor based. It is noted here that the order in which the determinative tests upon the various switches are performed is critical in achieving some of the objectives of the present speed determination, fault diagnostic and recovery. It is further noted that once a selection is made it is definitive with respect to any further switch queries. That is to say, once an output speed source is selected, the routine is ended and exited. Additionally, the speed setting blocks 157, 161, 165, 169, 173 and 177 all store the presently selected output speed in a location for use with respect to the selection based upon the Only_Mismatch switch as is apparent below.

Block 155 is first encountered and looks at the state of the Speed_Low_&_Motor_No switch. If the switch is true then the determination is immediately made to use the absolute value of Motor_No as the output speed No at block 157. As previously mentioned, this is advantageous at low vehicle speeds in a hybrid vehicle wherein motor speeds and speed data resolution is generally relatively high. It is even more advantageous when the speed sensors are variable reluctance sensors which are notorious for their low speed deficiencies. This is true regardless of the fault status of any of the speed sensors. Also at block 157, the present No selection is stored in No_prior for use in accordance with the Only_Mismatch switch. If the switch test in block 155 does not result in selection of an output speed source then block 159 is encountered. At block 159 the All_Clear switch state is queried and if set to a true value will select for the output speed, No, the average of the two speeds resulting from the known good sensors at block 161. It is noted here that at low vehicle speed, this switch is only effective if there is no motor based speed available for use as output speed. Also at block 161, the present No selection is stored in No_prior for use in accordance with the Only_Mismatch switch. Next, block 163 first checks the Only_Mismatch flag and if set to a true value, selects the stored output speed, No_prior, as the output speed at block 165. This switch recognizes an in-range speed differential error between the two sensors and accepts a speed with an error that is attenuated by providing an average speed signal from the two sensors. Switch test and output speed selection block pairs 167, 169 and 171, 173 are similar in function. Each switch test determines if one of the sensors is dropped while the other is fault free. The pair of tests on different switches determines which of the sensors is faulty in a one sensor good/one sensor dropped scenario. Thus, where one sensor is operative and the other is not, blocks 169 and 173 set the output speed, No, to the speed corresponding to the known good sensor as determined by the appropriate switch tests of blocks 171 and/or 167. Also at blocks 169 and 173, the present No selection is stored in No_prior for use in accordance with the Only_Mismatch switch. Finally in the selection routine of FIG. 8, the Both_Sig_fault_&_Motor_No switch is queried and if set to a true value will select as the output speed, No, the absolute value of Motor_No. This switch test recognizes fault in both sensors and utilizes Motor_No as the output speed even though output speed is above the low speed threshold at block 177. Block 177 also stores the present No selection in No_prior for use in accordance with the Only_Mismatch switch. If block 175 does not result in the selection of output speed via block 177, then block 179 sets the output speed to zero.

The present invention has been described with respect to a particular exemplary hybrid powertrain arrangement. Those skilled in the art will recognize that other hybrid arrangements can be used in conjunction with the present invention.

While the invention has been described by reference to certain preferred embodiments and implementations, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for determining the speed of a transmission member in a hybrid electric powertrain, said powertrain including a hybrid transmission having at least one electric motor operatively coupled to said transmission member and at least one rotation sensor for operatively sensing rotation of said transmission member, comprising:
    providing a first signal indicative of the speed of said transmission member calculated from the output from said at least one rotation sensor;
    providing a second signal indicative of the speed of said transmission member calculated from electrical phase information of said at least one electric motor and an effective rotation ratio between the transmission member and said at least one electric motor; and,
    selecting as the speed of the transmission member said second signal when predetermined conditions indicate that the first signal is unreliable.

2. The method for determining the speed of a transmission member as claimed in claim 1 wherein the transmission member comprises an output member.

3. The method for determining the speed of a transmission member as claimed in claim 1 wherein the predetermined conditions which indicate that the first signal is unreliable include a) speed of the transmission member below a predetermined threshold, and b) loss of sensor output.

4. Method for determining the speed of a transmission member in a hybrid electric transmission including at least one electric motor, comprising:
    providing as the speed of the transmission member a first speed signal calculated from at least one output from a redundant pair of rotation sensors operatively sensing rotation of the output member when either rotation sensor is providing an in-range output; and,
    providing as the speed of the transmission member a second speed signal calculated from electrical phase information of said at least one electric motor and an effective rotation ratio between the transmission member and said at least one electric motor when neither rotation sensor is providing an in-range output.

5. The method as claimed in claim 4 wherein said rotation sensors comprise variable reluctance sensors, further comprising:
    providing as the speed of the transmission member the second speed signal when output member speed is below a low-speed threshold.

6. Method for determining the speed of a transmission member in a hybrid electric powertrain, said powertrain including a hybrid transmission having at least one electric motor operatively coupled to said transmission member and at least one rotation sensor for operatively sensing rotation of said transmission member, comprising:
  providing a first signal indicative of the speed of said transmission member calculated from the output from said at least one rotation sensor;
  providing a second signal indicative of the speed of said transmission member calculated from electrical phase information of said at least one electric motor and an effective gear ratio between the transmission member and said at least one electric motor;
  selecting as the speed of the transmission member said first signal when a first set of conditions are met; and
  selecting as the speed of the transmission member said second signal when a second set of conditions are met.

7. Apparatus for determining speed of a transmission member in a hybrid electric powertrain, said transmission including at least one electric motor operatively coupled to said transmission member, comprising:
  a sensor adapted to sense rotation of the transmission member and provide a sensor output signal therefrom;
  a motor controller adapted to provide an electric motor speed signal from electrical phase information of said at least one electric motor; and,
  a computer based transmission controller having program instructions adapted to:
    calculate a first speed signal from the sensor output signal;
    calculate a second speed signal from the electric motor speed signal and an effective rotation ratio between said at least one electric motor and the transmission member;
    diagnose faults in the first and second speed signals; and
    select as the speed of the transmission member one of the first and second speed signals based on diagnosed faults.

8. The apparatus of claim 7 wherein the sensor comprises a variable reluctance sensor.

9. The method of claim 7 wherein the program instructions adapted to diagnose faults further includes program instructions adapted to identify whether there exists an in-range fault or a dropped or lost sensor output signal for the first speed signal.

10. The method of claim 7 wherein the program instructions adapted to diagnose faults further includes program instructions adapted to identify whether there exists an in-range fault or a dropped or lost sensor output signal for the second speed signal.

* * * * *